United States Patent
Kishida

(10) Patent No.: US 10,182,059 B2
(45) Date of Patent: Jan. 15, 2019

(54) NON-TRANSITORY COMPUTER READABLE MEDIUM STORING A PROGRAM CAUSING A COMPUTER TO PERMIT A GUEST USER TO HAVE UTILIZATION AUTHORITY USING A DIRECTORY, AND APPARATUS MANAGEMENT SYSTEM PERMITTING A GUEST USER TO HAVE UTILIZATION AUTHORITY USING A DIRECTORY

(71) Applicant: FUJI XEROX CO., LTD., Tokyo (JP)

(72) Inventor: Masayoshi Kishida, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 54 days.

(21) Appl. No.: 15/235,504

(22) Filed: Aug. 12, 2016

(65) Prior Publication Data

US 2017/0272445 A1    Sep. 21, 2017

(30) Foreign Application Priority Data

Mar. 15, 2016  (JP) ................................ 2016-050820

(51) Int. Cl.
*H04L 29/06*   (2006.01)
*H04L 29/12*   (2006.01)
(Continued)

(52) U.S. Cl.
CPC .......... *H04L 63/102* (2013.01); *G06F 3/1238* (2013.01); *G06F 21/31* (2013.01);
(Continued)

(58) Field of Classification Search
CPC ...... G06F 21/31; G06F 21/608; G06F 21/629; G06F 3/1222; G06F 3/1238;
(Continued)

(56) References Cited

U.S. PATENT DOCUMENTS

2007/0234400 A1   10/2007 Yanagi
2008/0244729 A1*  10/2008 Ozawa ................ G06F 21/6218
                                                       726/16

(Continued)

FOREIGN PATENT DOCUMENTS

JP     2007-257038 A    10/2007
JP     2009-087319 A     4/2009
(Continued)

*Primary Examiner* — Theodore C Parsons
(74) *Attorney, Agent, or Firm* — Oliff PLC

(57) ABSTRACT

A non-transitory computer readable medium storing a program causing a computer to execute a process: the process comprising: performing a first utilization permission process for an authorized user; and performing a second utilization permission process for a guest user, the second utilization permission process comprising: acquiring user identification information input by the guest user; inquiring, of a directory service that retains information of a member of an organization, whether the user identification information acquired by the acquiring is registered; and permitting the guest user who inputs the user identification information to use the system within a range of a utilization authority, which is different between a case where a response indicating that the user identification information is registered is received and a case where a response indicating that the user identification information is not registered is received, in response to the inquiry.

6 Claims, 12 Drawing Sheets

(51) Int. Cl.
  *G06F 21/31*   (2013.01)
  *G06F 3/12*    (2006.01)
  *G06F 21/62*   (2013.01)
  *G06F 21/60*   (2013.01)

(52) U.S. Cl.
  CPC ........ *G06F 21/629* (2013.01); *H04L 61/1552* (2013.01); *H04L 63/08* (2013.01); *G06F 3/1222* (2013.01); *G06F 3/1239* (2013.01); *G06F 21/608* (2013.01)

(58) Field of Classification Search
  CPC .............. G06F 3/1239; G06K 15/4095; H04L 9/3226; H04L 63/10; H04L 63/08; H04L 61/1552
  See application file for complete search history.

(56) References Cited

U.S. PATENT DOCUMENTS

| | | | |
|---|---|---|---|
| 2009/0070856 A1 | 3/2009 | Kim et al. | |
| 2010/0064358 A1* | 3/2010 | Luna | G06Q 10/06 726/6 |
| 2011/0141513 A1* | 6/2011 | Nakanowatari | H04N 1/32117 358/1.15 |
| 2014/0127994 A1* | 5/2014 | Nightingale | H04W 4/008 455/41.1 |
| 2015/0022846 A1 | 1/2015 | Nishida | |
| 2015/0026782 A1 | 1/2015 | Nishida | |

FOREIGN PATENT DOCUMENTS

| | | |
|---|---|---|
| JP | 2015-022617 A | 2/2015 |
| JP | 2015-022619 A | 2/2015 |

\* cited by examiner

FIG.3

| USER ID | MAIL ADDRESS | AUTHENTICATION INFORMATION | APPROVAL AUTHORITY | UTILIZATION AUTHORITY |
|---|---|---|---|---|
| ABC1234 | employeeA@fuji.local | ********** | NO | COPYING: COMPULSORY BLACK AND WHITE DOUBLE-SIDED<br>PRINTING: COMPULSORY BLACK AND WHITE DOUBLE-SIDED<br>SCANNING: ×<br>FACSIMILE-TRANSMITTING: × |
| BCD2345 | auth@fuji.local | ********** | YES | COPY: COLOR ENABLE<br>PRINT: COLOR ENABLE<br>SCANNING: ○<br>FACSIMILE-TRANSMITTING: ○ |

FIG.4

| OPERATION ID | ADDRESS RELATED | ID TYPE | APPROVER | UTILIZATION AUTHORITY | |
|---|---|---|---|---|---|
| 2345 | guest1@fuji.local | INTRA-COMPANY GUEST | | COPYING:COMPULSORY BLACK AND WHITE DOUBLE-SIDED<br>PRINTING:COMPULSORY BLACK AND WHITE DOUBLE-SIDED<br>SCANNING:×<br>FACSIMILE-TRANSMITTING:× | 2016/03/21 18:00 |
| 3456 | guest1@fuji.local | APPROVED | auth@fuji.local | COPYING:COMPULSORY BLACK AND WHITE DOUBLE-SIDED<br>PRINTING:COMPULSORY BLACK AND WHITE DOUBLE-SIDED<br>SCANNING:○<br>FACSIMILE-TRANSMITTING:○ | 2016/03/21 18:00 |
| 1111 | user@companyA.co.jp | OUTSIDE-COMPANY GUEST | | COPY:○(COLOR ENABLE)<br>PRINT:○(COLOR ENABLE)<br>SCANNING:×<br>FACSIMILE-TRANSMITTING:× | 2016/03/21 18:00 |

| INTRA-COMPANY | |
|---|---|
| FUNCTION | UTILIZATION AUTHORITY |
| COPYING | COMPULSORY BLACK AND WHITE DOUBLE-SIDED |
| PRINTING | COMPULSORY BLACK AND WHITE DOUBLE-SIDED |
| SCANNING | × |
| FACSIMILE-TRANSMITTING | × |
| ... | ... |

204

| OUTSIDE-COMPANY | |
|---|---|
| FUNCTION | UTILIZATION AUTHORITY |
| COPYING | COLOR ENABLE |
| PRINTING | COLOR ENABLE |
| SCANNING | × |
| FACSIMILE-TRANSMITTING | × |
| ... | ... |

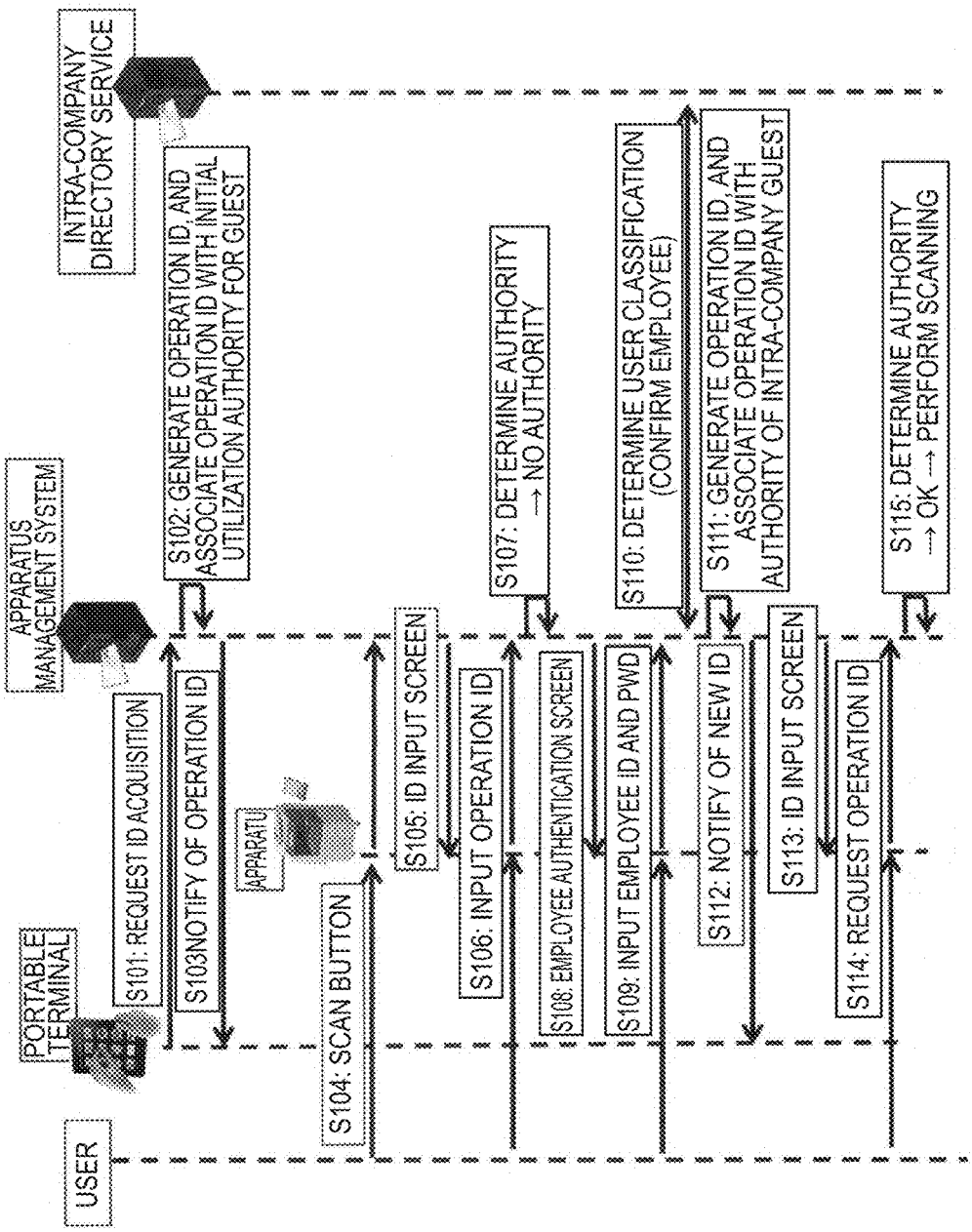

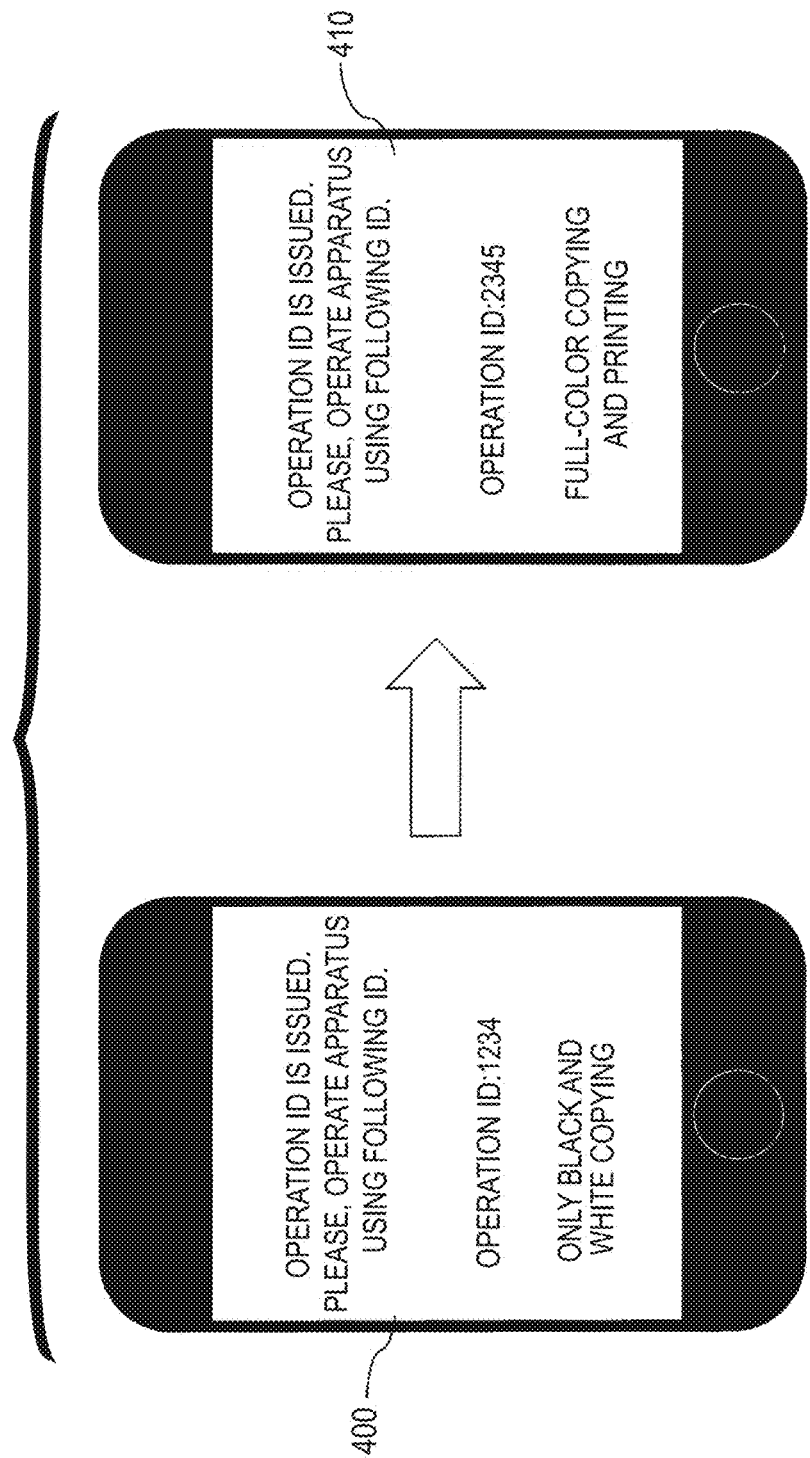

NON-TRANSITORY COMPUTER READABLE MEDIUM STORING A PROGRAM CAUSING A COMPUTER TO PERMIT A GUEST USER TO HAVE UTILIZATION AUTHORITY USING A DIRECTORY, AND APPARATUS MANAGEMENT SYSTEM PERMITTING A GUEST USER TO HAVE UTILIZATION AUTHORITY USING A DIRECTORY

CROSS-REFERENCE TO RELATED APPLICATIONS

This application is based on and claims priority under 35 USC 119 from Japanese Patent Application No. 2016-050820 filed Mar. 15, 2016.

BACKGROUND i) Technical Field

The present invention relates to a non-transitory computer readable medium, an information processing apparatus, and information processing apparatus.

SUMMARY

According to an aspect of the invention, a non-transitory computer readable medium stores a program causing a computer to execute a process for information processing. The process includes: performing a first utilization permission process that is used for an authorized user who is registered in a system, wherein when authentication information registered in the system is input by the user, the first utilization permission process permits utilization of the system within a range of a utilization authority of the authorized user registered in the system; and performing a second utilization permission process that is used for a guest user who is not registered in the system. The second utilization permission process includes: acquiring user identification information input by the guest user; inquiring, of a directory service that retains information of a member of an organization in which the system is provided, whether or not the user identification information acquired by the acquiring is registered; and permitting the guest user who inputs the user identification information to use the system within a range of a utilization authority, which is different between a case where a response indicating that the user identification information is registered is received and a case where a response indicating that the user identification information is not registered is received, in response to the inquiry in the inquiring.

BRIEF DESCRIPTION OF THE DRAWINGS

Exemplary embodiments of the present invention will be described in detail based on the following figures, wherein:

FIG. 3 is a diagram showing an example of information of an authorized user registered in a user information DB;

FIG. 4 is a diagram showing an example of operation ID information managed by a temporal utilization managing unit;

FIG. 5 is a diagram showing an example of a utilization authority for an inter-company guest and a utilization authority for an outside-company guest;

FIG. 11 is a sequence diagram showing a process when the guest uses a function having no necessity for approval in the second exemplary embodiment; and FIG. 12 is a diagram showing a display example of a web page for operation ID notification provided to a portable terminal of a guest in the second exemplary embodiment.

DETAILED DESCRIPTION

First Exemplary Embodiment

Figure 1:
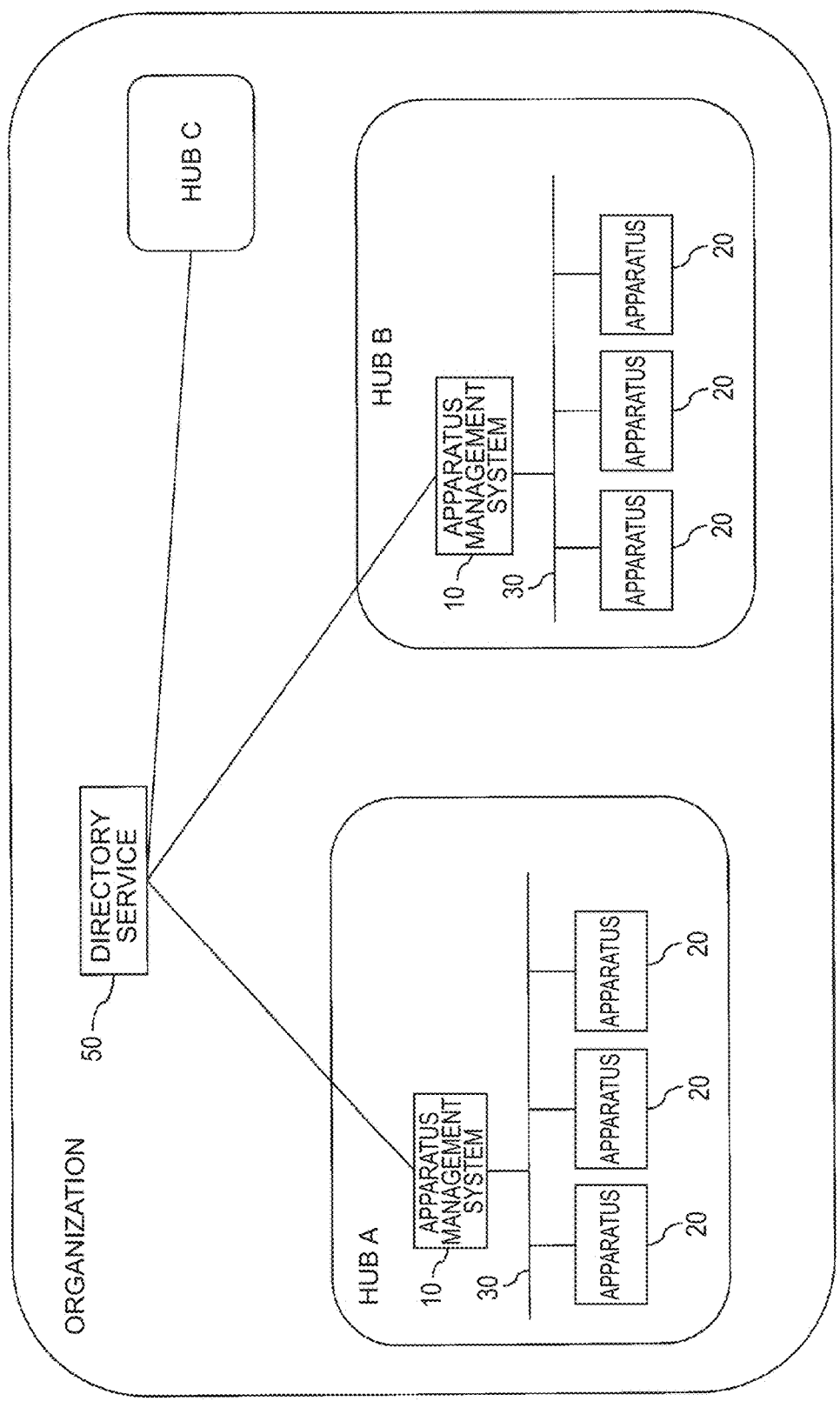
FIG. 1 is a diagram showing a configuration of a system to which a method according to a first exemplary embodiment is applied.

FIG. 1 shows an example of a system configuration to which a method of an exemplary embodiment of the present invention is applied.

A system described in FIG. 1 is, for example, a system for managing the utilization of apparatuses 20 provided in an organization such as a company or a school. For example, the apparatus 20 which is a management target is an apparatus that provides a service to a user, and is, for example, a printer, a scanner, a copying machine, a facsimile machine, or a multifunction machine (machine having functions of the printer, the scanner, the copying machine and the facsimile machine).

As shown in FIG. 1, the organization includes plural hubs A, B, C, . . . . A local network 30 such as a local area network (LAN) is provided in each of the hubs A, B, C, . . . . Personal computers, various servers, the apparatuses 20, and an apparatus management system 10 are connected to the local network 30.

The apparatus management system 10 provided in the hub is an information processing system that manages the apparatus 20 connected to the local network 30 in the corresponding hub. For example, as a process performed by the apparatus management system 10, there are user authentication of a user who attempts to use each apparatus 20, and control of the utilization of each apparatus 20 by the user. The apparatus management system 10 may have a function of registering a utilization history of each apparatus.

A user who mainly uses the hub (among the plural hubs within the organization), such as a person who uses the hub as a principal locality of residence, is registered in the apparatus management system 10 in the hub, and a user who mainly uses another hub within the organization is not registered in the apparatus management system. The user who is registered in the apparatus management system 10 is authenticated by the apparatus management system 10 by inputting a registered user ID (identification information) and a password in the apparatus 20 or swiping an IC card that retains the user ID through an ancillary reader of the apparatus 20. If the authentication succeeds, the apparatus 20 can be used in a range of a utilization authority of the user who is registered in the apparatus management system 10. In contrast, it is necessary for a person who belongs to the organization but is not registered as a user in the apparatus management system 10 in the hub to be granted the utilization authority in order to use the apparatus within the hub.

A directory service 50 in which attribute information items of all members belonging to the organization are registered is provided in the organization. For example, as the attribute information of the member registered in the directory service 50, there are a user ID (for example, an employee number), a password, an electronic mail address, and an affiliated department. In response to an inquiry from another information processing apparatus (for example, the apparatus management system 10) within the organization, the directory service 50 retrieves information of each registered member and sends the retrieval result as a response to the information processing apparatus as an inquiring source. For example, the directory service 50 is constructed as a server conformable to the Lightweight Directory Access Protocol (LDAP).

The directory service 50 is constructed using the entire organization as a target, retains information items of all members of the organization, and responds to the inquiries from the information processing apparatuses in all the hubs within the organization. In contrast, the apparatus management system 10 merely uses the hub in which the apparatus management system 10 is provided as a target, does not manage the apparatus 20 present in another hub, and does not individually manage the authentication information or the utilization authority of the user who is the member of the organization but mainly uses another hub. A person who is the member of the organization but is not registered as the user in the system 10 is a "guest" of the apparatus management system 10, like a person who is not the member of the organization. However, the apparatus management system 10 classifies guests into the member of the organization and the person who does not belong to the organization by the using the directory service 50, and gives the utilization authority according to the respective classifications.

The directory service 50 and the apparatus management system 10 in each hub are connected via, for example, a virtual private network (VPN).

Figure 2:
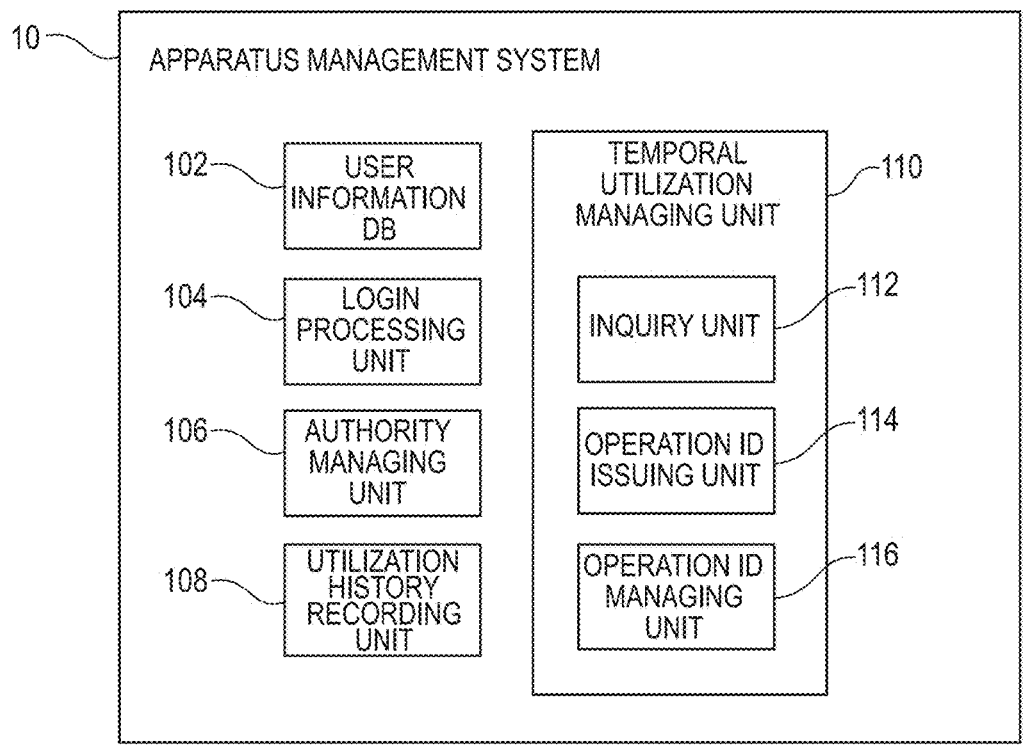
FIG. 2 is a diagram showing a configuration example of an apparatus management system according to the first exemplary embodiment.

FIG. 2 shows an example of an internal configuration of the apparatus management system 10. The apparatus management system 10 shown in FIG. 2 includes a user information database (DB) 102, a login processing unit 104, an authority managing unit 106, a utilization history recording unit 108, and a temporal utilization managing unit 110.

The user information DB 102 is a database that stores user information of each user registered in the apparatus management system 10. For example, as shown in FIG. 3, the user information DB 102 stores authentication information such as a user ID, an electronic mail address and a password, an approval authority, and a utilization authority over the apparatus 20. The utilization authority shown in FIG. 3 is an example in a case where the apparatus 20 is the multifunction machine, and refers to an authority of the user over four functions such as copying, printing, scanning and facsimile-transmitting. For example, a user of "ABC1234" is permitted for only black and white double-sided outputting in the copying and printing, and is not permitted in the scanning and facsimile-transmitting. The utilization authorities of four functions such as printing have been described in the drawing, but information of the utilization authority over another function may be registered in the user information DB 102. The approval authority is an authority of a user (for example, a user of "BCD2345") to approve the utilization of the apparatus 20 of another user. The user having the approval authority may permit another user to use the apparatus 20 in a range of the utilization authority of the user. Since the user of "ABC1234" does not have the approval authority, the user is not able to approve the utilization of the apparatus 20 of another user. In this case, even if the user has the approval authority, the user can approve only the black and white double-sided copying and printing, and is not able to approve black and white one-sided copying and printing or color copying and printing and is not able to approve the scanning or facsimile-transmitting.

The login processing unit 104 performs a login process of the user who attempts to use the apparatus 20. For example, if the user who is registered in the apparatus management system 10 inputs the user ID and the password to a login screen displayed on a display device (for example, a touch panel) of the apparatus 20, the user ID and the password are sent to the apparatus management system 10. By doing this, the login processing unit 104 investigates whether or not the user ID and the password are registered in the user information DB 102, and authenticates the login of the user if these information items are registered, and permits the user to use the apparatus 20. As one example, in a case where the information items input to the login screen by the user are only the electronic mail address other than the registered user ID and password, the login processing unit 104 recognizes that a login request is a temporal utilization request, and requests the temporal utilization managing unit 110 to perform a requested process. In addition to the login process of manually inputting the user ID, the user may log in by bringing an ID card (for example, an employee certificate card), which embeds IC and is conformable to a near-field wireless standard such as Near-field communication (NFC), into close proximity with a wireless communication port of the apparatus 20. In this case, if the authentication information of the reading result of the ID card sent from the apparatus 20 is registered in the user information DB 102, the login processing unit 104 authenticates the login of the user. In a case where the authentication information is not registered in the user information DB 102, the login processing unit 104 may recognize that the login request is a temporal utilization request, and may request the temporal utilization managing unit 110 to perform the requested process.

The authority managing unit 106 permits the user who logs in the apparatus 20 to use the apparatus 20 in a range of the utilization authority registered in the user information DB 102. That is, if an authority inquiry about the function instructed to be performed by the user is received from the apparatus 20, the authority managing unit 106 determines whether or not the user has the authority to use this function by referring to the authority information of the user within the user information DB 102. In a case where it is determined that the user has the authority from the authority information, the authority management unit sends notification of utilization permission as a response to the apparatus 20, and sends notification of utilization refusal as a response to the apparatus 20 in a case where it is determined that the user does not have the authority. For example, as for the utilization authority of the user registered in the user information DB 102, in a case where the copying function of the apparatus 20 is permitted for the black and white outputting but is not permitted for the color outputting, the authority managing unit 106 permits the black and white copying request from the user, but refuses the color copying request.

The utilization history recording unit 108 records information of the utilization history (log) of each apparatus 20.

The temporal utilization managing unit 110 manages the temporal utilization of the apparatus 20 by the user (that is, the guest) who is not registered in the apparatus management system 10. The temporal utilization managing unit 110 determines whether or not a guest user (hereinafter, referred to as a guest) who requests the temporal utilization is a user (for example, an employee in a case where the organization is the company) belonging to the organization by inquiring of the directory service 50. Utilization authority different from another guest is given to the guest who belongs to the organization. A unit that performs this inquiry is an inquiry unit 112. The inquiry unit 112 performs an inquiry by using a protocol such as LDAP corresponding to the directory service 50. As one example, the guest inputs their electronic mail address at the time of the login, and the inquiry unit 112 inquires of the directory service 50 whether or not this electronic mail address is registered (that is, whether or not this electronic mail address is the mail address of any member of the organization).

An operation ID issuing unit 114 issues an operation ID which is identification information for the temporal utilization to the guest. The operation ID is associated to the utilization authority corresponding to the classification to the guest. In a case where the guest receives the approval from the user (hereinafter, referred to as an "authorized user") who is registered in the apparatus management system 10, the operation ID is associated with information of the approved authority.

The operation ID managing unit 116 manages information of each operation ID, determines whether or not the operation performed on the apparatus 20 by the user can be used using the utilization authority corresponding to the operation ID presented by the user, and permits or refuses this operation depending on the determining result.

FIG. 4 shows an example of the information of the operation ID managed by the operation ID managing unit 116. This information includes the respective items such as an operation ID, an associated address, an ID type, an approver, utilization authority, and a validated date.

The associated address is an electronic mail address input by the guest at the time of the login.

The ID type is the classification of the operation ID, and has, for example, a value of an intra-company guest, an outside-company guest, or approval completion. The ID type of "intra-company guest" is the type of the operation ID issued to the user determined as the user (hereinafter, a user who satisfies this condition is referred to as an "intra-company guest") who is the member of the organization (that is, who is registered in the directory service 50) but is not registered in the apparatus management system 10. The ID type of "outside-company guest" is the type of the operation ID issued to the user determined as the guest (hereinafter, a user who satisfies this condition is referred to as an "outside-company" guest) who does not belong to the organization (that is, who is not registered in the directory service 50). The ID type of "approval completion" is the type of the operation ID associated with the utilization authority including the authority approved by the authorized user having the approval authority. In order for the intra-company guest or the outside-company guest assigned the operation ID to use the function that is not able to be used using the utilization authority corresponding to the operation ID, in a case where the authorized user having the approval authority gives the approval, the type of the operation ID corresponding to the approved authority is "approval completion".

The approver is identification information of the authorized user who approves the operation ID of the "approval completion" type. In this example, as the identification information of the authorized user, the electronic mail address of the authorized user is used.

The utilization authority is the utilization authority over the apparatus 20 associated with the operation ID. For example, as the result of inquiring of the directory service 50, the utilization authority previously determined to be used for the intra-company guest is associated with the operation ID assigned to the user determined as the intra-company guest. The utilization authority previously determined to be use for the outside-company guest is associated with the operation ID assigned to the user determined as the outside-company guest.

For example, the temporal utilization managing unit 110 includes intra-company guest utilization authority information 202 and outside-company guest utilization authority information 204 shown in FIG. 5. The former information is associated with the operation ID issued to the intra-company guest and the later information is associated with the operation ID issued to the outside-company guest. In the example of FIG. 5, the intra-company guest is permitted for only the black and white double-sided copying and printing according to an in-company rule, and the outside-company guest which is a visitor to the organization is permitted for the color copying and printing. Neither the intra-company guest nor the outside-company guest is permitted for the scanning and facsimile-transmitting. The utilization authorities for the intra-company guest and the outside-company guest shown in FIG. 5 are merely examples. The contents of the utilization authorities may be determined by an administrator of the apparatus management system 10 according to security policy of the organization or the hub.

The utilization authority including the approved authority is associated with the operation ID of "approval completion". In the example of FIG. 4, an operation ID of "2345" associated with the utilization authority information 202 for the intra-company guest is assigned to a user of guest1@fuji.local which is the intra-company guest at the time of the login. Thereafter, if the user receives the approval from the authorized user of "auth@fuji.local", for example, a new operation ID of "3456" to which the authority capable of using the function approved by the authorized user is added is assigned to the intra-company guest. For example, in a case where the guest who has the utilization authority in which the black and white double-sided outputting are compulsory for the copying and printing and the scanning and facsimile-transmitting are not permitted receives the approval for the authority over the scanning from the approver, a new utilization authority in which the black and white double-sided outputting are compulsory for the copying and printing and the scanning, the scanning is permitted and the facsimile-transmitting is not permitted, and a new operation ID associated with the utilization authority is provided to the guest. The method of issuing the new operation ID by updating the utilization authority is merely an example. Instead, the information of the utilization authority associated with the operation ID given to the guest may be updated in the operation ID information (FIG. 4) according to the approval.

The validated date indicates a date and time of the validate date of the operation ID. How to determine the validate date may be determined by an operator of the apparatus management system 10. An ending time of a business time of a day when the operation ID is issued may be set as the validate date, but not limited thereto.

Figure 6:
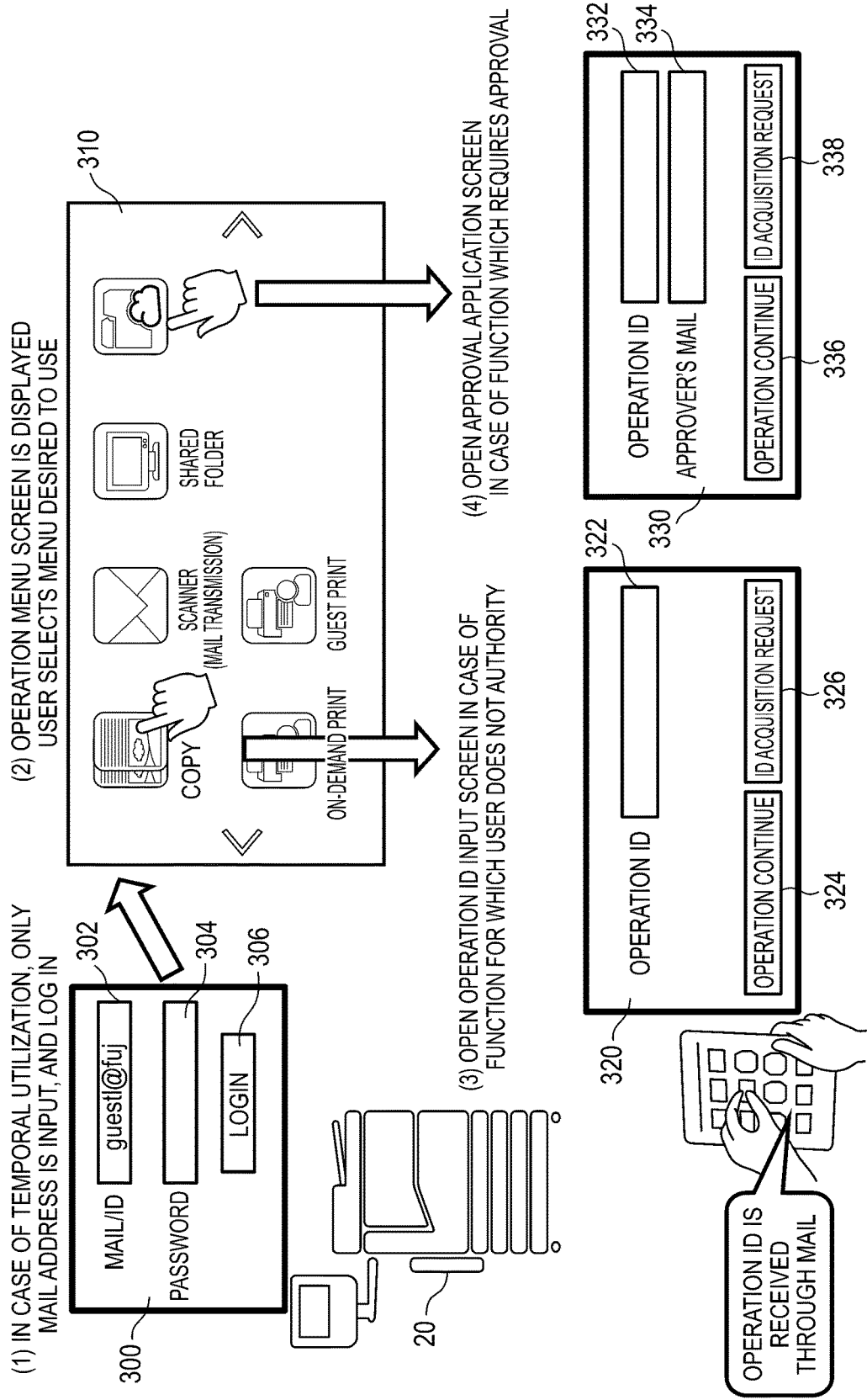
FIG. 6 is a diagram for describing a flow in which an apparatus is used by a guest in the first exemplary embodiment.

The flow of processes according to the present exemplary embodiment will be described in view of a user interface with reference to FIG. 6.

(1) An ID field 302 to which the electronic mail address or the user ID is input, a password field 304, and a login button 306 are displayed on a login screen 300 displayed on an ancillary display device (touch panel) of the apparatus 20. The authorized user who is registered in the apparatus management system 10 inputs the registered user ID and password in the ID field 302 and the password field 304, and presses the login button 306. Although not shown, information of "If you are a visitor, please input an electronic mail address mail address/ID field, and presses a login button. A password is not necessary. If you are an employee belonging to another department within the company, please input an electronic mail address of an employee." is displayed on the login screen 300. The guest inputs their electronic mail address to the ID field 302, and presses the login button 306. Accordingly, the login process is performed. Hereinafter, a flow in a case where the guest logs in will be described.

(2) After the login, a menu screen 310 is displayed on the display device. Icons indicating various functions provided by the apparatus 20 such as copying, scanning (transmitting of a scanning result to a designated mail address) and opening of a shared folder are displayed on the menu screen 310. The guest touches an icon of a function desired to use.

(3) In this regard, since this guest does not verify the authority through the input of the operation ID yet, this guest does not have the utilization authority over the apparatus 20 and the apparatus management system 10. In this case, an operation ID input screen 320 is displayed on the display device of the apparatus 20. In a case where the operation ID is already acquired, the guest inputs the operation ID to an operation ID input field 322 within the screen, and presses an operation continuous button 324. If the function touched in the above (2) can be used using the utilization authority corresponding to the operation ID, the apparatus 20 performs this function. If not, a message indicating that this function can be used by the operation ID and the operation ID input screen 320 are displayed again. In a case where the operation ID is not acquired, the guest presses an ID acquisition request button 326 within the operation ID input screen 320. By doing this, this request is transmitted to the apparatus management system 10 from the apparatus 20, the apparatus management system 10 generates the operation ID associated with the utilization authority corresponding to the classification of this guest (intra-company guest or outside-company guest), and sends the electronic mail including the operation ID to the electronic mail address of this guest. The guest can performed the selected function by receiving the electronic mail by their terminal, inputting the operation ID indicated by the electronic mail to the operation ID input field 322 and pressing the operation continuous button 324. The utilization of the function selected in the above (2) may not be permitted in some classifications of the guest. In this case, even though the acquired operation ID is input to the operation ID input screen 320, this function is not able to be used (in this case, an error is displayed on the screen).

(4) If the guest is not approved by the authorized user having the approval authority, the guest may not use some of the functions displayed on the menu screen 310 (if the authorized user can use the functions without approval within a range of their utilization authority). In a case where the function selected by the guest in the above (2) is such a function, an approval application screen 330 is displayed on the display device of the apparatus 20. This screen includes the operation ID input field 332 and an approver-mail-address input field 334. In a case the guest is not approved for the function, the guest inputs approver's mail address in the approver-mail-address input field 334, and presses an ID acquisition request button 338. In general, it is assumed that as the guest, there is an authorized user in a visit place within the hub. Particularly, such a situation is general in a company of which security is tight. Accordingly, the mail address of any authorized user in the visit place may be input to the approver-mail-address input field 334. If the approver's mail address is input and the ID acquisition request button 338 is pressed, the apparatus management system 10 sends the electronic mail for requesting the approval to this mail address. If the approver who receives this mail performs an approval operation, the apparatus management system 10 generates a new operation ID associated with new utilization authority to which authority capable of using the function is added, and sends an electronic mail representing the new operation ID to the mail address of this guest. The guest can perform the selected function by receiving this mail address through their terminal, inputting the operation ID represented in this electronic mail to the operation ID input field 332 within the approval application screen 330 and pressing the operation continuous button 336.

Hereinafter, the flow of processes according to the present exemplary embodiment will be described in more detail with reference to the sequence diagrams shown in FIGS. 7 and 8.

Figure 7:
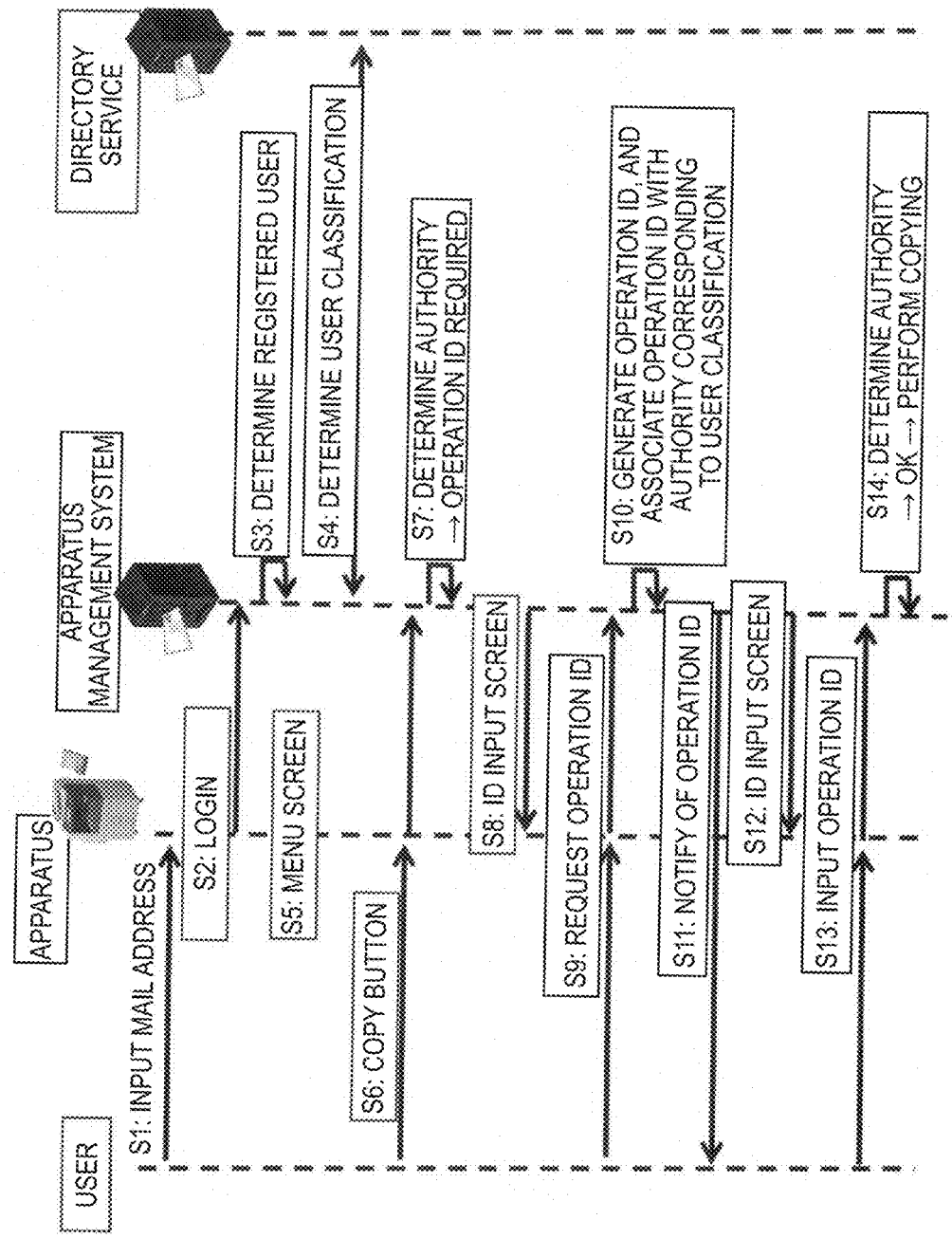
FIG. 7 is a sequence diagram showing a process when the guest uses a function having no necessity for approval in the first exemplary embodiment.
Figure 8:
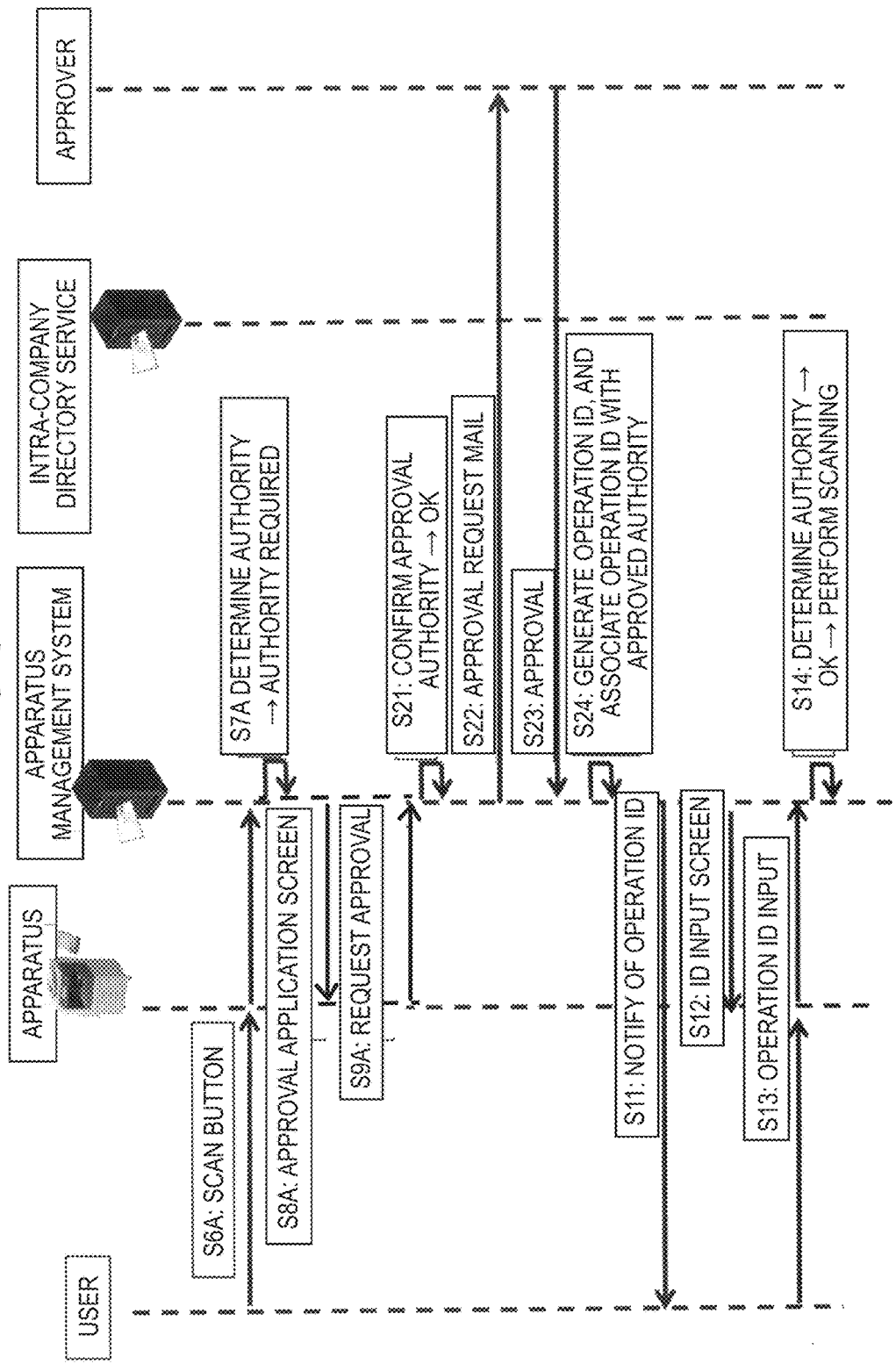
FIG. 8 is a sequence diagram showing a process when the guest uses a function having necessity for approval in the first exemplary embodiment.

FIG. 7 shows a flow in a case where the function selected by the guest on the menu screen 310 is a function having no necessity for the approver's approval.

Initially, the user inputs their user ID or electronic mail address and password (in the case of the authorized user) to the login screen 300 displayed on a console of the apparatus 20, and presses the login button (S1). The apparatus 20 that receives the input information starts a login process (S2). That is, the apparatus 20 transmits the information input by the user to the apparatus management system 10, and requests the login process.

In a case where the information input by the user includes two items of the user ID or electronic mail address and the password (in the case of the authorized user), the apparatus management system 10 that receives this request determines whether or not the user matching the combination of these two items is present within the user information DB (S3). In a case where the user is present, this user is an authorized user of the apparatus management system 10. In this case, the apparatus management system 10 may permit or refuse an operation instruction from this user under the same control as that of the related art according to the information of the utilization authority of this user registered in the user information DB 102. In a case where the user matching the combination of the input user ID and password is not found, an error process of prompting the user to input their information again is performed. Since the process performed for the authorized user may be the same as that of the related art, the process of S4 and the subsequent processes show a flow in a case where the user is the guest in S7 in FIG. 7.

In a case where the information input by the user in Si is only the electronic mail address, the apparatus management system 10 (the inquiry unit 112) sends an inquiry including this electronic mail address to the directory service 50. The directory service 50 investigates whether or not the information including the electronic mail address related to this inquiry is present among the information items of the registered members within the organization, and returns the result of the presence or absence of this information to the apparatus management system 10. The apparatus management system 10 (the temporal utilization managing unit 110) determines that the user who logs in is currently the intra-company guest if the response to the inquiry is "(the registration in the directory service 50 is) presence", and determines that this user is the "outside-company guest" if the response is "absence" (S4). The temporal utilization managing unit 110 stores the electronic mail address input in Si and information of the guest classification (intra-company or outside-company) determined in S4, as information of the user who currently uses the apparatus 20.

After S2, the apparatus 20 displays the menu screen 310 (S5). In the example of FIG. 7, it is assumed that the user (guest) selects an icon of the "copying" function which is not a target of the approval process on the menu screen 310. The apparatus 20 inquires of the apparatus management system 10 whether or not the user has the utilization authority over the selected "copying" function (S6).

In the example of FIG. 7, since the operation ID is not input even once until S6, this guest does not have the utilization authority over any one function. Accordingly, the apparatus management system 10 determines that it is necessary to input the operation ID (S7). The apparatus management system 10 instructs the apparatus 20 to display the operation ID input screen 320 (see FIG. 6) (S8).

Since the operation ID is not input, the guest presses the ID acquisition request button 326 of the operation ID input screen 320 (S9). This request is transmitted from the apparatus 20 to the apparatus management system 10. The apparatus management system 10 generates the operation ID in response to this request (S10). Since the information of the guest classification of the user who logs in in S1 and S2 is stored (see S4), the apparatus management system 10 registers the generated operation ID in the operation ID information (FIG. 4) such that the operation ID is associated with the information such as the utilization authority (see FIG. 5) corresponding to the guest classification or the electronic mail address in S10. In this case, the apparatus management system determines the validated date of the operation ID, and registers the validated date in the operation ID information. The apparatus management system 10 transmits the electronic mail indicating the generated operation ID to this electronic mail address (S11).

The apparatus management system 10 displays the operation ID input screen 320 on the apparatus 20 again (S12). The guest views the electronic mail from the apparatus management system 10 through their portable terminal, and inputs the operation ID indicated by the electronic mail to the operation ID input screen 320 (S13). The apparatus management system 10 acquires the information of the utilization authority corresponding to the input operation ID from the operation ID information, determines whether or not the "copying" function being requested by the guest is in a range of the utilization authority, and performs the copying process if this function is in the range (S14). For example, in a case where the guest is the intra-company guest having the authority content for compelling the black and white double-sided outputting in the copying (see FIG. 5), the apparatus 20 displays a copy setting screen through the input of the operation ID in S13. However, on the setting screen, color setting is fixed to "black and white" and one-sided or double-sided setting is fixed to "double-sided". Such settings are not able to be changed. The guest changes other changeable setting items if necessary, and performs copying. If the "copying" function being currently requested is not in the range of the utilization authority (the copying is not permitted), the apparatus management system displays an error screen including a message indicating that this function is not able to be used with the authority of this guest on the apparatus 20.

In a case where the process corresponding to the function requested by the guest is performed by the apparatus 20, the apparatus management system 10 records the log (history information) of the process in the utilization history recording unit 108. As the information indicating the user who requests this process, the electronic mail address input in 51 is recorded in this log.

A flow in a case where the function selected on the menu screen 310 by the guest is a function requiring the approver's approval will be described with reference FIG. 8. In the flow, the flow from the input (S1) of the electronic mail address to the determination (S4) of the guest classification and the display (S5) of the menu screen 310 is the same as that of the example of FIG. 7, and the steps of Si to S5 will not be shown in FIG. 8.

It is assumed that the function selected by the guest on the menu screen 310 displayed in S5 is a scanning function that requires the approval (S6A). Since this guest does not input the operation ID even once until S6A, the apparatus management system 10 determines that it is necessary to input the operation ID, and determines that the requested scanning function requires the approval (S7A). The apparatus management system 10 retains information indicating whether or not each function requires the approval, and performs the determination based on this information in S7A. The apparatus management system 10 instructs the apparatus 20 to display an approval application screen 330 (see FIG. 6) depending on this determination (S8A). Since the approval is not given, the guest inputs the electronic mail address of the person who has the approval authority among the authorized users in the visit place to the approver-mail-address input field 334 of the approval application screen 330, and presses the ID acquisition request button 338 (S9A). The request is transferred from the apparatus 20 to the apparatus managing system 10.

The apparatus management system 10 retrieves the user corresponding to the mail address of the input approver from the user information DB 102 (see FIG. 3), and checks whether or not the retrieved user has the approval authority (S21). In a case where the corresponding user is not founded, or in a case where the corresponding user is founded but does not have the approval authority, the apparatus management system displays an error screen for prompting the user to input another approver on the apparatus 20. Even though the approver input by the user has the approval authority, if this approver does not have the utilization authority over the function selected by the user in S6A, the apparatus management system displays the same error screen on the apparatus 20.

In a case where it is determined that the input approver is appropriate in S21, the apparatus management system 10 sends the electronic mail for requesting the approval to the electronic mail address of this approver (S22). This electronic mail includes, for example, a message of "the approval for the utilization authority over the scanning function of the multifunction machine is requested from <the electronic mail address of the guest input in S1>". Please, access to the following URL, and conducts the approval process." and a Uniform Resource Locator (URL) for the approval process. The URL is a URL of a web page for approval generated by the apparatus management system 10 in order to approve this approval request. If the approver accesses to this URL through their terminal, a login page is provided, and if the approver inputs the user ID and the password to the login page, the web page for approval is provided. If the approver presses the approval button represented on this page (S23), the apparatus management system 10 generates the operation ID, and registers the operation ID in the operation ID information (FIG. 4) such that the operation ID is associated with the utilization authority including the scanning authority which is requested from the guest and is approved (S24). In this case, the utilization authority corresponding to the operation ID is acquired by adding the scanning authority to the utilization authority corresponding to the classification of this guest. The apparatus management system 10 transmits the electronic mail indicating the generated operation ID to this electronic mail address (S11). The processes subsequent to S11 are the same as those in the example of FIG. 7.

As described above, in the present exemplary embodiment, the apparatus management system 10 determines whether the classification of the guest is the intra-company (which belongs to the organization) or the outside-company (which does not belong to the organization) by referring to the directory service 50, and gives the utilization authority corresponding to the determined classification to this guest. In the present exemplary embodiment, the guest receives the approval of the approver having the authority, and can use a specific function for the first time.

It has been described in the example of FIG. 7 that the operation ID is not provided to the guest yet when the classification of the guest who logs in is determined (S4) and the operation ID is provided to the guest after the guest designates the function desired to use on the menu screen 310 (S6) (S8 to S11). However, such a flow is merely an example. For example, the apparatus management system 10 may generate the operation ID associated with the utilization authority corresponding to this classification when the guest classification is determined in S4, and may transmit the generated operation ID to the electronic mail address of this guest. In such a case, the guest can input the operation ID received in S4 to the operation ID input screen 320 displayed on the apparatus 20 in S8.

Although it has been described in the above example that the system allows the guest user to input the electronic mail address and transmits the electronic mail for operation ID notification to the electronic mail address, such utilization of the electronic mail is merely an example. The system may allow the guest user to input another communication address other than the electronic mail address. For example, the system may allow the user to input a portable telephone number instead of the electronic mail, and may notify the guest user of the operation ID by using another notification tool such as Short Message Service using the portable telephone number as the communication address.

Second Exemplary Embodiment

Figure 9:
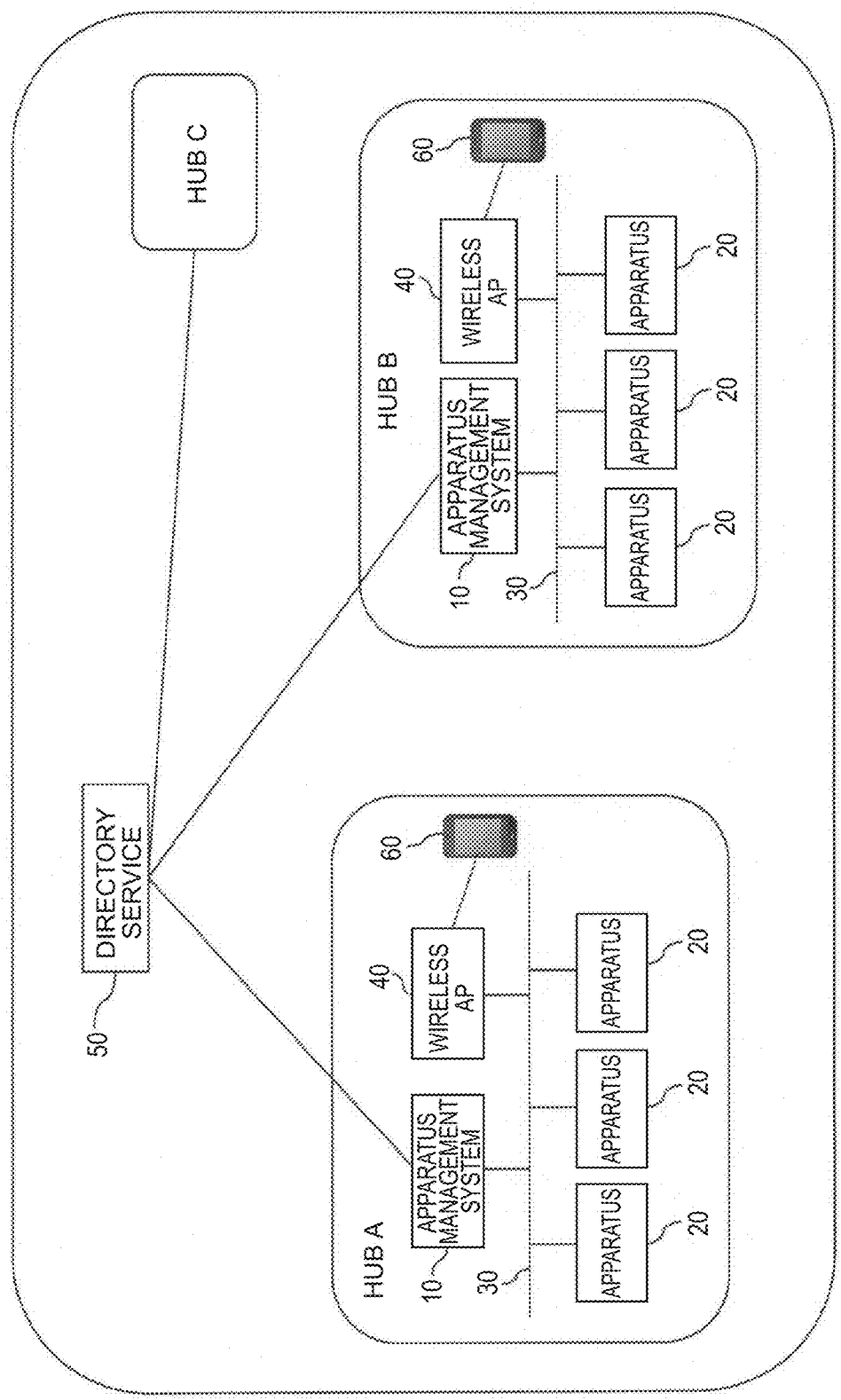
FIG. 9 is a diagram showing a configuration of a system to which a method according to a second exemplary embodiment is applied.

FIG. 9 shows an example of a system configuration to which a method according to the present exemplary embodiment is applied. In FIG. 9, the same elements as the elements shown in FIG. 1 will be assigned to the same reference numerals, and the description thereof will be omitted.

In the present exemplary embodiment, a wireless access point (AP) 40 is provided in the local network 30 within the hub. The guest participates in the local network 30 by being connected to the wireless AP 40 through wireless communication conformable to a wireless LAN standard such as Wi-Fi (registered trademark) using a portable terminal 60 such as a smart phone. In order to be wirelessly connected to the wireless AP 40 by using the portable terminal 60, information items of a service set identifier (SSID) of the wireless AP 40 and an encryption key (password) are required. However, it is assumed that the guest is informed of these information items from the authorized user at the visit place within the hub. Conversely, the guest mentioned herein is a person who is trusted by the organization or the hub to the point of being informed of the SSID and the encryption key of the wireless AP 40, and is, for example, a member of another hub within the same organization or a cooperator outside the organization who cooperates with the organization.

The apparatus management system 10 prepares the URL for receiving an issuance request of the operation ID for using the apparatus 20, and provides a web page for ID issuance reception if the guest accesses to this URL. However, only the access performed inside the same local network 30 (subnet) as that of the apparatus management system 10 is gained. Since a person who accesses from the same local network 30 is granted the participation in the local network 30 (for example, the person is informed of the SSID and the encryption key of the wireless AP 40), this person is a person who is trusted by the hub to some extent. In the present exemplary embodiment, the apparatus management system issues the operation ID to only such a person. For example, whether or not the access to the URL is performed inside the same local network 30 (subnet) may be determined depending on whether or not a media access control (MAC) address of the terminal (for example, the portable terminal 60) as an accessing source can be acquired from the apparatus management system 10 by the Address Resolution Protocol (ARP).

Figure 10:
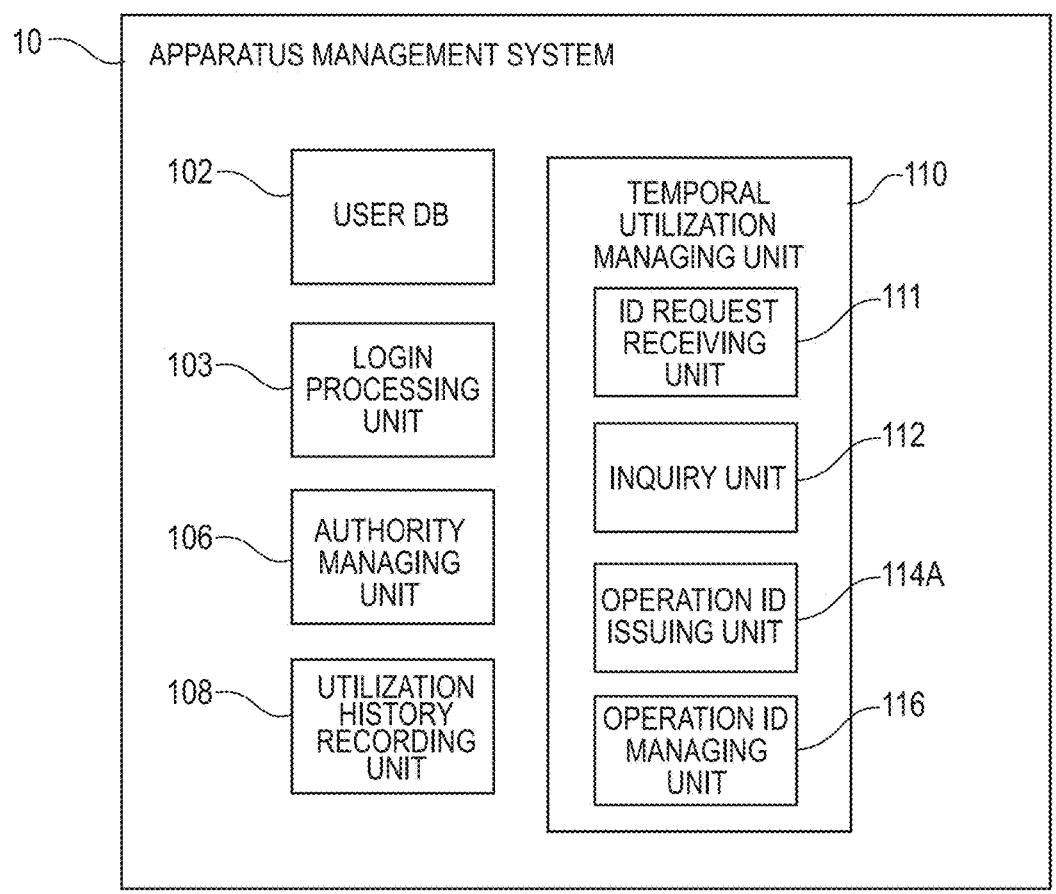
FIG. 10 is a diagram showing a configuration example of an apparatus management system according to the second exemplary embodiment.

FIG. 10 shows a configuration of the apparatus management system 10 according to the present exemplary embodiment. The apparatus management system 10 of FIG. 10 includes an ID request receiving unit 111 as well as the apparatus management system 10 according to the first exemplary embodiment shown in FIG. 2.

The ID request receiving unit 111 provides the web page for ID issuance reception, and receives the ID request from the user on the web page. Here, the ID request receiving unit 111 checks whether or not the terminal (for example, the portable terminal 60) accessing to the web page for ID issuance reception is present on the same local network 30, and sends the web page for ID issuance reception as a response if the terminal is present on the same local network 30. A web browser of the portable terminal 60 displays the web page for ID issuance reception, and the ID issuance request is transmitted from the web browser to the apparatus management system 10 if the guest presses an ID issuance request button displayed on the web page. The ID request receiving unit 111 receives the ID issuance request, and transmits the received ID issuance request to an operation ID issuing unit 114A. In a case where the access to the web page for ID issuance reception is not performed inside the same local network 30, the ID request receiving unit 111 does not send the web page for ID issuance reception, and sends an error page indicating that the operation ID is not able to be provided since the access is performed outside the network, as a response.

In a case where the ID issuance request from the guest is received through the ID request receiving unit 111, the operation ID issuing unit 114A generates the operation ID associated with previously determined initial utilization authority (hereinafter, referred to as "initial utilization authority"). The web page representing the operation ID is returned to the web page as a requesting source. For example, the initial utilization authority is previously determined as authority given to the request from the ID request receiving unit 111, and is authority with a low level set such that the authority over only black and white copying is permitted and the authority over another function such as printing or scanning via the network is not permitted. The administrator of the apparatus management system 10 may determine the content of the initial utilization authority is determined according to the security policy, and may set the determined content to the apparatus management system 10.

If an authority upgrade request is received from the guest, and also if the guest is the intra-company guest, the operation ID issuing unit 114A provides the operation ID associated with the utilization authority having higher-authority content to the guest (or upgrades the content of the initial utilization authority corresponding to the original operation ID to the authority content for the intra-company guest). Whether or not the guest as the requesting source of the authority upgrade request is the intra-company guest is determined by requesting that the guest input the user information and authentication information (password) registered in the directory service 50 of the organization. That is, the apparatus management system causes inquiry unit 112 to inquire of the directory service 50 whether or not the user information and authentication information input in response to this request is reliably registered, and determines that this guest is the intra-company guest in a case where a response indicating that these information items are registered is acquired. In a case where the response from the directory service 50 indicates that "these information items are not registered", this guest is the outside-company guest, and the outside-company guest is not granted the upgrading of the utilization authority with the authority upgrade request.

Similarly the first exemplary embodiment, in a case where the approval is given from the authorized user having the approval authority, the operation ID issuing unit 114A performs a process of expanding the utilization authority of the guest (newly provides the operation ID to which, for example, the authority over the approved function is added to the guest).

The flow of processes according to the present exemplary embodiment will be described with reference to FIG. 11.

Initially, if the user (guest) enters the hub, the user connects their portable terminal 60 to the wireless AP 40 within the hub. The web browser of the portable terminal 60 accesses to the web page for ID issuance reception acquired from the authorized user at the visit place, and performs the acquisition request of the operation ID (S101).

The apparatus management system 10 determines whether or not the portable terminal 60 accessing to the web page for ID issuance reception is present within the same local network 30 (same subnet). In a case where it is determined that the portable terminal is present within the same local network 30, the operation ID associated with the previously determined initial utilization authority is generated (S102), and the web page representing the operation ID is returned to the portable terminal 60 (S103). The apparatus management system 10 generates the entry of the operation ID in the operation ID information (see FIG. 4), and registers the information of the initial utilization authority in the entry.

FIG. 12 shows a display example of a web page 400 for operation ID notification. A value "1234" of the operation ID and the description of "only the black and white copying" which is the content of the initial utilization authority are displayed on the web page 400.

It is assumed that the guest displays the menu screen 310 (see FIG. 6) on the display device (touch panel) of the apparatus 20 and presses, for example, the icon of the scanning function among the menus (S104). The apparatus 20 inquires of the apparatus management system 10 whether or not to execute the selected scanning function. Since the guest who operates the apparatus 20 conducts neither the login as the authorized user nor the input of the operation ID, the apparatus management system 10 determines that this guest does not have the utilization authority over the apparatus 20, and displays the operation ID input screen 320 on the display device of the apparatus 20 (S105).

Here, for example, it is assumed that the guest inputs the operation ID which is acquired a while ago and is displayed on the screen of the portable terminal 60 (S106). The apparatus management system 10 that receives the operation ID from the apparatus 20 collates the content of the utilization authority corresponding to the operation ID and the function (scanning) requested by the guest who desires to use this function (S107). At this time, since the operation ID acquired by the guest is associated with the initial operation authority ("only the black and white copying") acquired in S103, it is determined that the guest does not have the authority over the scanning in S107. In this case, the apparatus management system 10 instructs the apparatus 20 to display an employee authentication screen (S108). Although not shown in the drawing, the employee authentication screen includes a user ID input field and a password input field, and the guest inputs the user ID and the password registered in the organization (the directory service 50) to these input fields if the guest is the member of the organization (for example, the company having the hub) (S109).

If the user ID and the password input by the guest are acquired from the apparatus 20, the apparatus management system 10 inquires of the directory service 50 whether or not the user corresponding to the pair of the user ID and the password is registered through the inquiry unit 112 (S110). If the guest is registered, the guest is the member (employee) of the organization, and is classified as the intra-company guest. In a case where the response from the directory service 50 to this inquiry indicates that "the guest is registered", the apparatus management system 10 generates a new operation ID associated with the utilization authority for the intra-company guest which is previously determined (S111), and notifies the web browser of the portable terminal 60 of the operation ID (S112). For example, the apparatus management system 10 may perform this notification by updating the content of the web page for operation ID notification provided to the portable terminal 60 in S103 to the content representing the new operation ID. For example, the apparatus management system regularly inquires whether or not the web page for operation ID notification is updated to the URL of the corresponding page, and acquires the updated web page if the web page is updated. In such a configuration, the web page representing the new operation ID is displayed on the portable terminal 60. As another example, an update button may be provided on the web page for operation ID notification, an update request may be transmitted to the apparatus management system 10 if the guest presses the update button, and the web page representing the new operation ID may be sent as a response from the apparatus management system 10. FIG. 12 shows an example of a web page 410 representing the new operation ID after the authority is upgraded.

The new operation ID generated in S111 may be displayed on the display device of the apparatus 20.

After S109, the apparatus management system 10 displays the operation ID input screen 320 again (S113). The guest inputs the new operation ID acquired in S112 to the operation ID input screen 320, and the operation ID is transmitted to the apparatus management system 10 from the apparatus 20 if the operation continuous button 324 (see FIG. 6) (S114). The apparatus management system 10 investigates the utilization authority corresponding to the operation ID, and permits the apparatus 20 to execute the scanning function if it is recognized that the requested scanning function is permitted (in this example, it is assumed that the scanning authority is included in the utilization authority of the intra-company guest) based on the investigating result (S115).

The major configurations and processes of the second exemplary embodiment have been described. Similarly to the first exemplary embodiment, in the second exemplary embodiment, there are also some functions of the functions provided by the apparatus 20 requiring the approval of the authorized user having the approval authority when the guest uses the function. The process of the apparatus management system 10 in a case where the guest selects the function that requires the approval on the menu screen 310 (see FIG. 6) may be basically the same as that of the first exemplary embodiment. The operation ID associated with the approved authority is notified to the electronic mail address of the guest in the first exemplary embodiment, whereas the operation ID is notified in the form of the same web page for operation ID notification (or the display on the display device of the apparatus 20) as that of S103 in the second exemplary embodiment.

As described above, in the second exemplary embodiment, the initial utilization authority having a low level is given to the guests who operate the terminals that participate in the same local network 30 as that of the apparatus management system 10, and the utilization authority having higher level is given to the person corresponding to the intra-company guest of these guests in response to the request. Accordingly, the guest uses the apparatus 20 with the authority corresponding to the classification of the outside-company or the intra-company.

It has been described in the first and second exemplary embodiments that the guest receives the approval for the utilization of the apparatus 20 for each function, and instead, the same utilization authority as that of the approver may be given to the guest in a case where the approver approves the utilization authority.

Although it has been described in the first and second exemplary embodiments that whether or not the approval of the authorized user for the utilization of the guest is required for each function is previously determined, such a configuration is merely an example. Instead, these functions are not limited to a specific function, and in a case where the function requested by the guest who uses this function is not granted the utilization by using the utilization authority corresponding to the operation ID, the guest may use this function by receiving the approval from the authorized user.

The apparatus management system 10 described above is realized by causing a computer to execute programs representing the functions of the system. Here, the computer is, for example, hardware, and has a circuit configuration in which a microprocessor such as a CPU, a memory (primary storage) such as a random-access memory (RAM) or a read-only memory (ROM), a controller that controls a fixed storage device such as a hard disk drive (HDD) or a solid-state drive (SSD), various input/output (I/O) interfaces, and a network interface that controls connection with a network such as a local area network are connected through, for example, a bus. A disk drive for reading and/or writing on a portable disk recording medium such as CD or DVD, and a memory reader/writer for reading and/or writing on a portable non-volatile recording medium having various standards such as flash memory may be connected to this bus via, for example, an I/O interface. The programs in which the processing contents of the respective functional modules described above are written are stored in the fixed storage device via the recording medium such as CD or DVD or via communication tools such as a network, and are installed in the computer. The programs stored in the fixed storage device are read into the RAM and are executed by the microprocessor such as CPU, and thus, the functional module group described above is realized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for information processing: the process comprising:

performing a first utilization permission process that is used for an authorized user who is registered in a system, wherein when authentication information registered in the system is input by the user, the first utilization permission process permits utilization of the system within a range of a first utilization authority of the authorized user registered in the system; and performing a second utilization permission process that is used for a guest user who is not registered in the system, the second utilization permission process comprising:

acquiring user identification information input by the guest user;

inquiring, of a directory service that retains user identification information of members belong to an organization in which the system is provided, whether or not the user identification information acquired by the acquiring is registered in the directory service, the members belonging to the organization including the authorized user registered in the system and members other than the authorized user, the directory service being constructed using the entire organization as a target, the direct service retaining information items of all of the members belonging to the organization, and responding to the inquiry, the directory service being used to classify the guest user as having a second utilization authority or a third utilization authority;

permitting the guest user who inputs the user identification information which is registered in the directory service to use the system within a range of the second utilization authority which is different from the first utilization authority; and permitting the guest user who inputs the user identification information which is not registered in the directory service to use the system within a range of the third utilization authority which is different from the first utilization authority and the second utilization authority.

2. The non-transitory computer readable medium according to claim 1,
wherein the user identification information is a communication address of the guest user,
wherein the permitting comprises:
transmitting, to the communication address, temporary identification information that is associated with the second utilization authority in the case where the communication address is registered in the directory service or that is associated with the third utilization authority in the case where the communication address is not registered in the directory service; and
permitting, in a case where the temporary identification information is input by the guest user, the guest user to use the system according to the second utilization authority or the third utilization authority which is associated with the temporary identification information.

3. The non-transitory computer readable medium according to claim 1,
wherein the second utilization permission process further comprises:
providing, upon receiving a utilization request of the system, if a transmitting source of the utilization request is an apparatus on a same local network as a local network of the system, temporary identification information associated with a fourth utilization authority to the apparatus which is the transmitting source,
wherein the permitting comprises:
providing, in the case where the response indicating that the user identification information is registered in the directory service is received in response to the inquiry in the inquiring, temporary identification information associated with the second utilization authority to the guest user; and
permitting, in a case where the temporary identification information is input by the guest user, the guest user to use the system according to the second utilization authority associated with the temporary identification information.

4. The non-transitory computer readable medium according to claim 1,
wherein the second utilization permission process comprises:
determining whether or not a function of the system selected as a utilization target by the guest user is a function that requires approval of an authorized user having an approval authority;
requesting the approval of the authorized user having the approval authority in a case where it is determined that the function selected as the utilization target requires the approval; and
adding an authority capable of using the function selected as the utilization target to a utilization authority of the guest user if the approval is given.

5. An apparatus management system comprising:
at least one processor; and
a memory storing a program causing the at least one processor to execute the program, the program having instructions for the at least one processor to act as:
a first utilization permission unit that is used for an authorized user who is registered in the system, wherein when authentication information registered in the system is input by the user, the first utilization permission unit permits utilization of the system within a range of a first utilization authority of the authorized user registered in the system; and
a second utilization permission unit that is used for a guest user who is not registered in the system,
wherein the second utilization permission unit includes:
an acquisition unit that acquires user identification information input by the guest user;
an inquiry unit that inquires, of a directory service that retains user identification information of members belonging to an organization in which the system is provided, whether or not the user identification information acquired by the acquisition unit is registered in the directory service, the members belonging to the organization including the authorized user registered in the system and members other than the authorized user, the directory service being constructed using the entire organization as a target, the directory service retaining information items of all of the members belonging to the organization, and responding to the inquiry, the directory service being used to classify the guest user as having a second utilization authority or a third utilization authority; and
a permission unit that permits the guest user who inputs the user identification information which is registered in the directory service to use the system within a range of a second utilization authority which is different from the first utilization authority, and that permits the guest user who inputs the user identification information which is not registered in the directory service to use the system within a range of a third utilization authority which is different from the first utilization authority and the second utilization authority.

6. The apparatus management system according to claim 5, wherein the program further has instructions for the at least one processor to act as:
a determination unit that determines whether or not a function selected as a utilization target by the guest user is a function of that requires approval of an authorized user having an approval authority; and
an authority addition unit that requests the approval of the authorized user having the approval authority in a case where it is determined that the function selected as the utilization target requires the approval, and adds an authority capable of using the function selected as the utilization target to a utilization authority of the guest user if the approval is given.

* * * * *